United States Patent Office 2,741,596
Patented Apr. 10, 1956

2,741,596

PARAFFIN SOLVENTS

Joseph Luark, Kenedy, and Walter S. Ellis, Luling, Tex.

No Drawing. Application May 20, 1953, Serial No. 356,318

9 Claims. (Cl. 252—8.55)

This invention relates to solvents and methods of using the same, and more particularly to solvents for paraffin and methods of utilizing them for removing paraffin from clogged wells, formations and pipe lines in oil field operations.

Many crude petroleums contain large amounts of paraffin, and this frequently precipitates, deposits and accumulates in well tubing, flow lines, etc., and even in the oil bearing formations themselves, thus reducing or completely stopping the passage of oil.

Numerous attempts have been made to develop a solvent by which accumulations of paraffin wax can be dissolved and removed, but such solvents as heretofore proposed leave much to be desired.

An object of the present invention is to provide a solvent which will effectively reduce the paraffin wax to liquid form and maintain it in that condition, so that it may readily flow or be pumped out from well tubing and flow lines.

Another object is to devise an efficient solvent which has a specific gravity greater than that of water, so that when introduced into a well containing a body of water, it will sink through such water, and reach the lower part of the well where the wax has accumulated.

Still another object of the invention is to devise an improved method of treating wells for the purpose of increasing or renewing the flow of oil from formations which have become clogged with paraffin, especially chalk and lime formations, before resorting to the usual step of treating such formations with acid.

We have discovered that a particularly effective solvent can be prepared by mixing acetone with a light petroleum fraction having a specific gravity on the order of that of acetone, namely, about .78 to .81. Petroleum fractions of this kind are commonly known as kerosene. We find that such a mixture of acetone and kerosene will dissolve paraffin wax more effectively and rapidly than any other solvent hitherto known, and that the wax, when so dissolved, will remain in liquid condition indefinitely.

Neither kerosene nor acetone is an effective solvent by itself. Kerosene alone acts very slowly and is unsatisfactory, and acetone, while re-acting with paraffin to some extent, appears to have a tendency to convert it into a gummy substance. We are unable to explain the reason why our improved mixture works so efficiently, but the addition of acetone appears to tremendously speed up the solvent action of the kerosene, and the kerosene seems to counteract the tendency of acetone to form a gummy material.

We have found that the most desirable mixture is approximately equal parts of acetone and kerosene, although other proportions can be successfully used, as shown by the appended examples.

We have found that the larger the proportion of acetone, the more rapid is the solvent action of the mixture, but the solution tends to revert to a waxy consistency on standing.

We have also experimented with different grades of kerosene, and have found that the higher the gravity and flash point of the kerosene, the faster is the solvent action of the mixture.

The solubility of paraffin in our improved mixture varies, of course, with temperature, the higher the temperature, the greater the solvent power, but we have found that with the optimum mixture, our new solvent will successfully dissolve paraffin wax at all temperatures usually encountered in oil field practice, even as low at 40° F., although the action is, of course, slower at low temperatures.

Example 1

Two pounds of hard, dry paraffin wax were immersed in one pint of a mixture of substantially equal parts of acetone and kerosene of 43.2° Baumé, with a flash point of 134° F., at a temperature of 115° F. (The reason for choosing 115° F. in this and the following examples is because this is approximately the temperature of a certain formation in Texas which produces paraffin bearing oil.) At the end of one hour the paraffin was completely changed into liquid form, and remained that way, regardless of temperature.

Example 2

One half pound of paraffin was immersed in one quart of a mixture of approximately equal parts of acetone and kerosene of the same grade as above, at 115° F., and was completely dissolved in thirty-two minutes, and remained in solution.

Example 3

Two pounds of hard, dry paraffin were immersed in one pint of a mixture of substantially equal parts of acetone and kerosene of the same grade as above, at a temperature of 74° F. At this temperature, two hours were required to bring the paraffin into solution.

Example 4

By using one quart each of acetone and kerosene of the same grade as above, we were able to dissolve two pounds of hard, dry paraffin in 10 minutes, at 115° F.

Example 5

Two pounds of paraffin of the same type as in the preceding example were immersed in a mixture of one quart of acetone to two quarts of kerosene of the same grade as above, at 115° F., and were completely dissolved in 15 minutes, instead of 10 minutes, as in the preceding example.

Example 6

Two pounds of the same type of paraffin as above were immersed in a mixture of two quarts of acetone and one quart of kerosene of the same grade as above, at 115° F. The paraffin completely dissolved in eight minutes, but, upon cooling to around 90° F., the solution reverted to a hard waxy consistency.

Example 7

Using kerosene of the same grade as in Example 1, we immersed two pounds of hard paraffin wax in a mixture of one quart of kerosene and one quart of acetone at 80° F., and found that the paraffin went completely into solution in nine minutes.

Example 8

Using kerosene of 49° Baumé and with a flash point of 300° F., and employing the same mixture and same quantities as in the preceding example, we found that the paraffin completely dissolved in five minutes, as against nine minutes, before.

Example 9

In a certain small pumping well in Texas, yield had been reduced to 6.35 barrels of oil a day. 100 gallons of solvent consisting of a mixture of substantially equal parts of acetone and kerosene was poured into the casing, followed by 70 barrels of displacement oil to force the solvent out into the formation. Well was shut in over night. Then, after the displacement oil was pumped out, the well produced 9.80 barrels a day, and continued to do so for 47 days.

Example 10

Another pumping well in Texas had encountered much trouble from paraffin clogging the pump. On previous occasions, it had been the practice to pull the sucker rods and tubing together, and then burn the hard paraffin out of the tubing. On the occasion of this test, the well had ceased producing, and the paraffin wax had accumulated in the tubing to such an extent that the pump rods would not drop, on the down stroke. When the pump was unseated from the bottom of the tubing, it required over two hours for the oil in the tubing to seep down through the mass of wax and escape. After the oil had trickled out, 50 gallons of solvent, consisting of a mixture of acetone and kerosene, was poured in the tubing, and after 3 hours the paraffin had been dissolved to such an extent that it was possible to pull the pump up through the tubing.

Example 11

In a third Texas well, production had dwindled to 2.65 barrels. 100 gallons of solvent, consisting of a mixture of acetone and kerosene, was poured into the casing, and the tubing plugged at the well head. 22 barrels of displacement oil were then introduced, and 200 lbs. per square inch of pressure applied to the oil, thus forcing the solvent out of the bottom of the well into the formation. The well was then shut in over night, and the next day pumping was started. In 17 hours, all of the displacement oil was recovered, plus 12.72 barrels additional. Production was increased from the original 2.65 to 9.62 barrels a day.

Example 12

In some cases, paraffin drops out or is precipitated in the storage tanks, and gets so high that the pipe line companies will not run the oil. In a case like this, a solvent, consisting of a mixture of acetone and kerosene, was poured into the tank, at the rate of about one gallon to every 20 barrels of residue, and mass was agitated by bubbling air or gas through it. After a short time, the paraffin was reduced to a liquid state, and the tank put back in operation.

We believe it probable that, especially in chalk and lime formations, the crevices and passages often become clogged or lined with paraffin, and that this paraffin protects the formation from the action of the hydrochloric acid commonly used to increase the flow of oil. Thus, the acid fails to produce the expected results. We therefore, subject the formation to the action of our improved solvent, in order to dissolve and remove the adhering coating of paraffin, before employing the acid treatment, so that the acid may come into better actual contact with the lime material.

Both acetone and kerosene are lighter than water, so that our improved solvent will ordinarily tend to float on the surface of a body of water in a well, and not penetrate it. Where there is water standing in a well, and it is desired to dissolve paraffin from the lower part of the well, below the water line, we prepare a special solvent by adding to our usual mixture of acetone and kerosene a sufficient amount of some compatible, relatively heavy, mutually miscible liquid to raise the specific gravity of the mixture to a value greater than that of water. Carbon tetrachloride, with a specific gravity of 1.58, perchloroethylene or carbon dichloride, with a specific gravity of 1.63, and perchloroethane or carbon hexachloride, with a specific gravity of 2.09, are examples of such liquids.

As an illustration, we have found that by adding carbon tetrachloride to our solvent until the specific gravity of the mixture is raised to a value somewhat greater than 1 (i. e., until the mixture weighs at least 9 pounds per gallon), this mixture will go right down through the water to the bottom of the well. We have further found that while such a mixture will effectively dissolve paraffin, its solvent action is several times slower than the standard mixture of acetone and kerosene alone.

What we claim is:

1. A paraffin solvent consisting essentially of a mixture of substantially equal parts of acetone and kerosene.

2. The method of dissolving paraffin wax at a temperature below its melting point which comprises subjecting it to the action of a liquid consisting essentially of a mixture of one part of acetone with from one to two parts of kerosene.

3. The method of increasing the production of an oil well clogged by paraffin wax which comprises treating such wax, in the well, at a temperature below its melting point, with a liquid consisting essentially of a mixture of one part of acetone with from one to two parts of kerosene.

4. A paraffin solvent consisting essentially of a mixture of one part of acetone with one to two parts of kerosene.

5. A paraffin solvent consisting essentially of a mixture of one part of kerosene with one to two parts of acetone.

6. A paraffin solvent consisting essentially of a mixture of one part of acetone with one to two parts of a light petroleum fraction having a specific gravity of from about .78 to .81.

7. A paraffin solvent consisting essentially of a mixture of kerosene with a sufficient quantity of acetone to substantially speed up the solvent action of the kerosene but not enough to cause the solution to revert, on standing, to a waxy consistency.

8. A paraffin solvent consisting essentially of a mixture of one part of acetone with one to two parts of kerosene; to which mixture has been added a sufficient amount of a compatible, mutually miscible, relatively heavy liquid to raise the specific gravity of the mixture to a value greater than that of water.

9. The method of removing paraffin from a well containing a standing body of water which comprises the step of pouring into the well a paraffin solvent liquid consisting of a mixture of one part of acetone with one to two parts of kerosene, to which mixture has been added a sufficient amount of a compatible, mutually miscible, relatively heavy liquid to raise the specific gravity of the mixture to a value greater than that of water, whereby the solvent composition settles to the bottom of the well.

References Cited in the file of this patent

UNITED STATES PATENTS

| Number | Name | Date |
|---|---|---|
| 1,307,562 | Metz et al. | June 24, 1919 |
| 1,476,747 | Wolever | Dec. 11, 1923 |
| 1,822,886 | Elderkin | Sept. 15, 1931 |
| 2,135,589 | Monson | Nov. 8, 1939 |
| 2,221,353 | Limerick et al. | Nov. 12, 1940 |
| 2,265,923 | Normand | Dec. 9, 1941 |

FOREIGN PATENTS

| Number | Country | Date |
|---|---|---|
| 152,911 | Switzerland | May 16, 1932 |

OTHER REFERENCES

Bennett: "Chemical Formulary," vol. 1, page 77, published 1933, by Van Nostrand Co. of N. Y. (Copy in Div. 64.)